United States Patent Office 3,178,478
Patented Apr. 13, 1965

3,178,478
2-AMINO-5-HALO-INDANES
Charles Ferdinand Huebner, Chatham, N.J., assignor to Ciba Corporation, a corporation of Delaware
No Drawing. Filed Feb. 13, 1961, Ser. No. 88,614
4 Claims. (Cl. 260—578)

The present invention concerns 2-amino-indane compounds. More particularly, it relates to compounds of the formula:

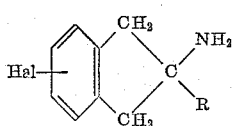

in which R stands for hydrogen or methyl, and Hal represents halogeno, and therapeutically acceptable acid addition salts thereof, as well as process for the manufacture of such compounds.

Although R may represent methyl, it stands primarily for hydrogen.

The halogeno atom Hal, attached to any position available for substitution in the hexacyclic aromatic portion of the indane nucleus, i.e. the 4-position, and particularly the 5-position, represents particularly fluoro, but may also stand for chloro, bromo or iodo.

Salts of the compounds of this invention are particularly therapeutically acceptable acid addition salts with inorganic, mineral acids, e.g. hydrochloric, nitric, sulfuric, phosphoric acids and the like, as well as with organic acids, e.g. acetic, propionic, glycolic, maleic, malic, tartaric, citric, salicylic, 4-aminosalicylic, 2-phenoxybenzoic, 2-acetoxybenzoic, methane sulfonic, ethane sulfonic, 2-hydroxyethane sulfonic, 1,2-ethane disulfonic, toluene sulfonic acid and the like.

Compounds of the present invention may be obtained in the form of racemates, which may be resolved into the optically active antipodes.

The compounds of this invention show analgesic properties; they are therefore capable of raising the pain threshold and thus alleviate pain and symptoms thereof.

Particularly strong analgesic properties are exhibited by 2-amino-5-fluoro-indane of the formula:

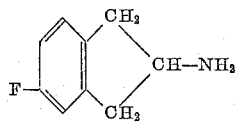

the optically active antipodes thereof, and the therapeutically acceptable mineral acid addition salts of such compounds.

The new compounds of this invention may be used in the form of pharmaceutical preparations, which contain the new indane compounds or the salts thereof in admixture with a pharmaceutical organic or inorganic, solid or liquid carrier suitable for enteral or parenteral administration. For making up the preparations there may be employed substances used in manufacturing of pharmaceutical preparations, which do not react with the new compounds, such as water, gelatine, lactose, starches, magnesium stearate, stearyl alcohol, talc, vegetable oils, benzyl alcohols, gums, propylene glycol, polyalkylene glycols or any other suitable carrier for pharmaceutical preparations. The latter, which may be prepared according to known methods, may be in solid form for example, as capsules, tablets, dragées, and the like or in liquid form, for example, as solutions, suspensions, emulsions and the like. If desired, they may contain auxiliary substances, such as preserving, stabilizing, wetting, emulsifying agents and the like, salts for varying the osmotic pressure and buffers. They may also contain, in combinations, other therapeutically useful substances.

The compounds of this invention, particularly those of the formula:

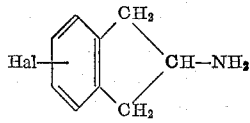

in which Hal represents halogeno, particularly fluoro, or salts thereof, may be prepared by converting in a 2-$R_0$-indane compound, which contains a halogeno, especially a fluoro, atom attached to the hexacyclic aromatic portion of the indane nucleus, and in which $R_0$ represents a substituent capable of being converted into an amino group, or a salt thereof, the substituent $R_0$ into an amino group, and, if desired, converting a resulting salt into the free base, and/or, if desired, converting a free base into a salt thereof, and/or, if desired, separating a mixture of isomers into the single isomers.

A preferred group $R_0$, which is capable of being converted into an amino group, is represented, for example, by the oximino group or its tautomer, the nitroso group; these groups are easily reduced into the desired amino group.

The reduction may be carried out according to known methods, for example, by treatment with catalytically activated hydrogen, for example, in the presence of a catalyst containing a metal of the eighth group of the Periodic System, e.g. palladium and the like, using a solution of the starting material in an inert solvent, e.g. acetic acid, methanol, ethanol and the like, or any other suitable diluent to ensure complete solution. The reduction may be performed at an elevated temperature, and, if necessary, under pressure.

The conversion of the substituent attached to the 2-position into an amino group may also be carried out by treatment with nascent hydrogen, as generated by a metal or a metal compound in the presence of a hydrogen donor, such as, an alkali metal in the presence of an alkanol, e.g. sodium in the presence of ethanol and the like, or with a metal hydride, e.g. lithium aluminum hydride and the like.

The starting materials used in the above procedure may be prepared according to procedures used for the manufacture of known analogs. For example, an indan-2-one compound, which contains a halogeno atom attached to the hexacyclic aromatic portion of the indane nucleus, may be reacted with hydroxylamine or a salt thereof according to known methods to yield the desired starting material.

The compounds of the present invention, particularly those of the formula:

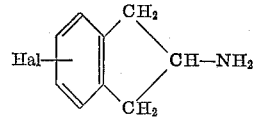

in which Hal has the above-given meaning, but represents primarily fluoro, or salts thereof, may also be prepared, for example, by reacting a 2-$R_0$-indan-1-one compound, which contains a halogeno, particularly a fluoro, atom attached to the hexacyclic aromatic portion of the indane nucleus, and in which $R_0$ has the previously-given meaning, or a salt thereof, with a reducing reagent capable of simultaneously converting $R_0$ into an amino and the carbonyl group in the 1-position into a methylene group, and, if desired, carrying out the optional steps.

The above reduction is carried out by treatment with catalytically activated hydrogen; hydrogen in the presence of a catalyst containing a metal of the eighth group of the Periodic System, particularly of a palladium catalyst, and of an acidic medium, for example, in the presence of a lower alkanoic acid, e.g. acetic acid and the like, or of a mixture of such acid with a mineral acid, e.g. hydrochloric, sulfuric acid and the like, represents the reduction reagent of choice. The acidic medium may simultaneously serve as the diluent; additional solvents may be added to ensure complete solution. An elevated temperature and/or, an increased pressure may be necessary.

The starting material used in the above procedure may be prepared according to procedures used for analogous compounds; for example, an indan-1-one compound, containing a halogeno, particularly a fluoro, atom attached to the hexacyclic aromatic portion of the indane nucleus, may be treated with a nitrosating reagent, such as, for example, an organic nitrite, e.g., n-pentyl-nitrite and the like, according to known methods.

Furthermore, the compounds of this invention may also be prepared by converting in a 2-amino-indane compound of the formula:

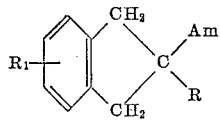

in which R has the previously-given meaning, Am represents an amino or a temporarily protected amino group and $R_1$ stands for a substituent capable of being converted into a halogeno atom, or a salt thereof, the substituent $R_1$ into a halogeno atom, and, if necessary, converting a temporarily protected amino group into a free amino group, and, if desired, carrying out the optional steps.

The substituent $R_1$ is primarily represented by an amino group; upon diazotization (e.g. treatment with a nitrite, e.g. sodium nitrite and the like, in the presence of an acid, e.g. hydrochloric, sulfuric acid and the like) and subsequent Sandmeyer reaction, for example with a cuprous halide, e.g. cuprous chloride, cuprous bromide and the like, the amino group yields the desired halogeno atom.

A temporarily protected amino group Am is primarily an acylated amino, such as an N-lower alkanoyl-amino, e.g. N-acetyl-amino and the like, group. If necessary, a temporarily protected amino group, especially an N-amino group, may be converted into a free amino group according to known methods, for example, by hydrolysis.

The starting materials may be prepared according to known methods. Thus, a 2-N-acylamino-indane compound may be nitrated, for example, by treatment with nitric acid, a resulting mixture of isomeric 2-N-acylamino-indane compounds, which contain a nitro group attached to the hexacyclic aromatic portion of the indane nucleus, may be separated into the single isomers, and the latter may then be converted into the desired starting materials by reduction, for example, with catalytically activated hydrogen, nascent hydrogen or a light metal hydride; these reactions are carried out according to known methods.

Resulting racemates of the compounds of this invention may be resolved into the optical active d- and l-forms according to procedures known for the resolution of racemic compounds. For example, a solution of the free base of a racemic d,l-compound in a suitable solvent or solvent mixture, may be treated with one of the optically active forms of an acid containing an asymmetric carbon or a solution of such compound. Especially useful as optically active forms of salt forming acids having an asymmetric carbon atom are D-(l)-tartaric acid or L-(d)-tartaric acid; the optically active forms of di-O-toluyl-tartaric, malic, mandelic, camphor-10-sulfonic, quinic acid N-acylated amino acids, e.g. N-acetyl-L-phenylalamine and the like may also be used. From the resulting reaction product, salts formed by the optically active acid with an optically active form of the base can be separated and isolated. An isolated salt may be converted into the free and optically active base, and an optically active base may be converted into a therapeutically useful acid addition salt with one of the acids mentioned hereinbefore; these procedures are carried out as described hereinbelow. The optically active forms may also be isolated by biochemical methods.

Depending on the conditions used, the compounds of this invention are obtained in the form of the free bases or the salts thereof. A salt may be converted into the free base, for example, by reaction with a basic reagent, such as an alkali metal hydroxide, e.g. hydroxide, sodium, potassium hydroxide and the like, an alkali metal carbonate, e.g. sodium carbonate, potassium hydrogen carbonate and the like, ammonia, and anion exchanger and the like. A free base may be converted into its therapeutically useful acid addition salts by reacting it with one of the acids outlined hereinbefore, for example, by treating a solution of the base in a solvent, such as a lower alkanol, e.g. methanol, ethanol, n-propanol, isopropanol and the like, or any other suitable diluent or mixture of diluents with the acid or a solution thereof. The salts may also be obtained as the hemihydrates, monohydrates, sesquihydrates or polyhydrates depending on the conditions used in the formation of the salts.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

A mixture of 6-fluoro-2-nitroso-indan-1-one, 0.95 ml. of concentrated sulfuric acid, 50 ml. of glacial acetic acid and 0.1 g. of palladium black is shaken for eighteen hours with hydrogen under about 3 atmospheres pressure, while maintaining a temperature of 60°. The catalyst is filtered off; the filtrate is neutralized by adding aqueous sodium hydroxide and evaporated to dryness under reduced pressure. The residue is taken up in a minimum amount of water, the aqueous solution is made basic with aqueous ammonia, and the organic material is extracted with diethyl ether. The organic solution is washed, dried and evaporated to yield the desired 2-amino-5-fluoro-indane of the formula:

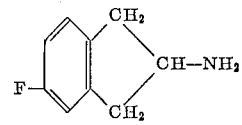

The oily residue is treated with ethanolic hydrogen chloride, and the desired 2-amino-5-fluoro-indane hydrochloride is recrystallized from ethanol, M.P. 250–253°; yield: 1.8 g.

The starting material may be prepared as follows: A mixture of 20 g. of 4-fluoro-benzaldehyde, 43 g. of malonic acid and 34 ml. of pyridine is heated on the steam bath for four hours. The reaction mixture is then poured onto ice and acidified with aqueous hydrochloric acid. The resulting 4-fluoro-cinnamic acid is collected, washed with water and air-dried, M.P. 207–210°; yield: ca. 90 percent.

A mixture of 22.0 g. of 4-fluoro-cinnamic acid, 220 ml. of 90 percent ethanol and 1.2 g. of palladium (10 percent on charcoal) is shaken at room temperature with hydrogen under about 4 atmospheres pressure. The uptake of one mol of hydrogen is complete after about ninety minutes. The catalyst is filtered off, and the filtrate is evaporated to dryness under reduced pressure to yield the β-(4-fluoro-phenyl)-propionic acid, M.P. 88–90°; yield: 20 g.

A mixture of 21.5 g. of β-(4-fluoro-phenyl)-propionic acid in 215 g. of polyphosphoric acid is vigorously stirred at 85–87° for twenty-five minutes. The hot reaction mixture is poured onto ice, and the organic material is extracted with diethyl ether. The organic solution is washed with water, aqueous sodium hydrogen carbonate and again with water, dried over magnesium sulfate and evaporated to dryness. The resulting 6-fluoro-indan-1-one is purified by recrystallization from hexane, M.P. 55–57°; yield: 13.45 g.

To a solution of 4.0 g. of 6-fluoro-indan-1-one in 10 ml. of ethanol is added 4.0 g. of n-pentyl nitrite while maintaining a temperature of 15°. The mixture is then treated dropwise with 1.0 ml. of concentrated hydrochloric acid while keeping the temperature below 45°. After completion of the addition, the reaction mixture is stirred at 45° for thirty minutes and then cooled; 3.05 g. of the desired 6-fluoro-2-nitroso-indan-1-one is collected, M.P. 334–337° (decomposition).

The 2-amino-4-fluoro-indane hydrochloride, M.P. 225°, may be prepared according to the previously-described procedure, i.e. by reacting 2-fluoro-benzaldehyde with malonic acid, reducing the resulting 2-fluoro-cinnamic acid (M.P. 177–181°) to the β-(2-fluoro-phenyl)-propionic acid (M.P. 78°), ring-closing the latter to the 4-fluoro-indan-1-one (B.P. 97°/0.7 mm.) nitrosating the 4-fluoro-indan-1-one and reducing the 4-fluoro-2- nitroso-indan-1-one (M.P. 201–203°) with catalytically activated hydrogen.

*Example 2*

To a mixture of 10 g. of 2-acetylamino-5-amino-indane in 20 ml. of concentrated hydrochloric acid and 30 g. of ice, kept at 5°, is added, in small portions while stirring, a solution of 3.5 g. sodium nitrite in 10 ml. of water. The resulting diazonium reagent is then added while stirring to freshly prepared cuprous chloride (prepared by treating a solution of 1.5 g. of cupric sulfate and 4 g. of sodium chloride in 50 ml. of hot water with a solution of 3.5 g. of sodium bisulfite and 1.8 g. of sodium hydroxide in 25 ml. of water while stirring; the solution is cooled in an ice bath, and the supernatant liquid is decanted from the precipitated cuprous chloride). 25 ml. of concentrated hydrochloric acid is added to the reaction mixture which is then gradually heated to 60–70° and held at this temperature for one hour. The organic material is then extracted with ether, the ether is removed by distillation, and the residue is refluxed for two hours with a mixture of 25 ml. of concentrated hydrochloric acid and 100 ml. of ethanol. The solvent is then stripped off under reduced pressure, and the residue is crystallized from ethanol to yield 2-amino-5-chloroindane hydrochloride of the formula:

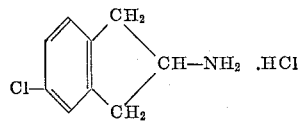

The starting material may be prepared as follows: A solution of 14.8 g. of 2-indanone in 75 ml. of pyridine is added to a solution of 9.35 g. of hydroxylamine hydrochloride in 50 ml. of aqueous ethanol, and the reaction mixture is allowed to stand for two days at room temperature. The precipitate, formed after being poured onto ice-water, is filtered off and then air dried to yield the 2-oximino-indane, M.P. 150–154° C.; yield: 92.3 percent.

A solution of 7.6 g. of 2-oximino-indane in a mixture of 150 ml. of ethanol and 21.75 ml. of a 7.1 N solution of hydrogen chloride in ethanol is treated with hydrogen in the presence of 0.75 g. of a palladium catalyst (20 percent palladium on charcoal). The catalyst is filtered off, the filtrate is concentrated and the resulting 2-amino-indane hydrochloride is recrystallized from a mixture of ethanol and ethyl acetate, M.P. 233–240° C.

A mixture of 2-amino-indane hydrochloride, 11.1 ml. of acetic acid anhydride and 25 g. of crushed ice is stirred while adding dropwise 40 percent aqueous sodium hydroxide until permanent basicity is reached. The resulting 2-acetylamino-indane is filtered off.

A total of 5 ml. of fuming nitric acid is added to 20 ml. of acetic acid anhydride while stirring and externally cooling to keep the temperature between 20° and 25°. The nitration mixture is then cooled to —30° and 5.0 g. of 2-acetylamino-indane is added in small portions to the stirred reagent. The temperature is maintained at —30° for twenty minutes and is then allowed to rise to 0°. 100 g. of crushed ice is added to the reaction mixture, which is then neutralized with sodium carbonate, and extracted with diethyl ether. The organic solution is evaporated to yield a residue from which the desired 2-acetylamino-5-nitro-indane can be isolated.

A solution of 5 g. of 2-acetylamino-5-nitro-indane in 100 ml. of ethanol is treated with hydrogen under about 4.5 atmospheres pressure, using a Raney nickel catalyst. After the theoretical amount of hydrogen is absorbed within about 30 minutes, the catalyst is filtered off, and the filtrate is evaporated to dryness and the 2-acetylamino-5-amino-indane is recovered.

*Example 3*

A solution of 2-acetylamino-2-methyl-5-amino-indane in a mixture of concentrated hydrochloric acid and ice, whenever treated with sodium nitrate and then with cuprous chloride as shown in Example 2, yields the desired 2-amino-5-fluoro-2-methyl-indane hydrochloride of the formula:

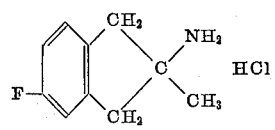

The starting material may be prepared as follows: To a refluxing solution of 74.0 g. of potassium cyanide in 125 ml. of water, diluted with about 200 ml. of ethanol is added 135 g. of α,α'-dibromo-o-xylene in portions. The reaction mixture is refluxed for an additional thirty minutes and is then diluted with water until the product oils out. The organic material is extracted with diethyl ether, the extract solution is washed with water, dried and then evaporated. The solid residue is re-crystallized from ethanol to yield α,α'-dicyano-o-xylene, M.P. 58–60° C.; yield: 57 g.

A solution of 20.0 g. of α,α'-dicyano-o-xylene in 800 ml. of ethanol is heated to reflux, using a wide-bore condenser. 20.0 g. of sodium is added through the condenser as rapidly as possible, while heating is interrupted. After cooling, the reaction mixture is diluted with ethanol and then acidified with hydrochloric acid. The solid material is filtered off, the ethanol is evaporated under reduced pressure, and the remaining solution is made basic with aqueous ammonia while cooling. The organic material is extracted with diethyl ether, the ether solution is separated, washed, dried and evaporated. The remaining residue is cooled and made basic with aqueous ammonia; the organic material is extracted into diethyl ether, the extract solution is washed, dried and evaporated. The remaining oil is distilled to yield 5.5 g. of 2-amino-2-methyl-indane, B.P. 103–105°/12 mm., which is converted into the hydrochloride, M.P. 225–232°, after recrystallization from a mixture of ethanol and diethyl ether.

The amino group in the 2-amino-2-methyl-indane hydrochloride is then acetylated by treatment with acetic anhydride, the 2-acetylamino-2-methyl-indane is nitrated by reaction with nitric acid, and a mixture of isomeric compounds is separated; the isolated 2-acetylamino-2-methyl-5-nitro-indane is hydrogenated in the presence of Raney nickel to yield the desired starting material; these reactions are carried out as shown in Example 2.

The compounds of the formula:

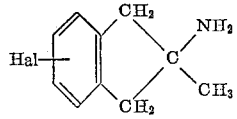

in which Hal has the previously-given meaning, or salts thereof, may also be prepared by treating a compound of the formula:

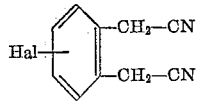

in which Hal has the above-given meaning, with a ring-closing reducing reagent, and, if desired, carrying out the optional steps.

Ring-closing reducing reagents are metals in the presence of a hydrogen donor, especially basic reducing reagents such as alkali metals, e.g. sodium, potassium and the like, in the presence of a lower alkanol, e.g. methanol, ethanol, n-butanol and the like.

What is claimed is:

1. A member selected from the group consisting of a compound of the formula:

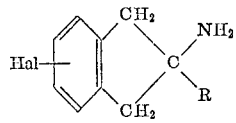

in which R stands for a member selected from the group consisting of hydrogen and methyl, and Hal represents halogeno, and an acid addition salt thereof with a therapeutically acceptable acid.

2. 2-amino-5-fluoro-indane.

3. An acid addition salt of 2-amino-5-fluoro-indane with a therapeutically acceptable acid.

4. 2-amino-5-fluoro-indane hydrochloride.

References Cited by the Examiner

UNITED STATES PATENTS

| | | | |
|---|---|---|---|
| 2,541,967 | 2/51 | Kolloff et al. | 260—570.5 |
| 2,645,640 | 7/53 | Charpentier. | |
| 2,666,082 | 1/54 | Scudi et al. | |
| 2,882,318 | 4/59 | Kundiger et al. | |
| 2,966,491 | 12/60 | Pfister et al. | |
| 3,024,166 | 3/62 | Kuna et al. | |
| 3,068,148 | 12/62 | Freedman et al. | |

FOREIGN PATENTS

| | | |
|---|---|---|
| 936,507 | 12/55 | Germany. |
| 937,952 | 1/56 | Germany. |
| 937,953 | 1/56 | Germany. |
| 940,045 | 3/56 | Germany. |
| 952,441 | 11/56 | Germany. |

CHARLES B. PARKER, *Primary Examiner.*